United States Patent
Boyes et al.

(10) Patent No.: US 7,796,650 B2
(45) Date of Patent: Sep. 14, 2010

(54) DEVICE AND METHOD FOR DETERMINING A VOICE TRANSMISSION DELAY OVER A PACKET SWITCHED NETWORK

(75) Inventors: David John Boyes, Roanoke, VA (US); Jason Lee Davis, Salem, VA (US); Bill Michael Kowalkowski, Roanoke, VA (US)

(73) Assignee: Acterna LLC, Germantown, MD (US)

( * ) Notice: Subject to any disclaimer, the term of this patent is extended or adjusted under 35 U.S.C. 154(b) by 1222 days.

(21) Appl. No.: 11/372,673

(22) Filed: Mar. 10, 2006

(65) Prior Publication Data

US 2007/0223387 A1 Sep. 27, 2007

(51) Int. Cl.
*H04J 1/02* (2006.01)

(52) U.S. Cl. .................. 370/493; 370/242; 370/236; 370/231; 370/395.52; 370/525

(58) Field of Classification Search .................. 370/252, 370/352, 235, 244, 249, 395.52, 401, 242, 370/231, 248, 356, 493
See application file for complete search history.

(56) References Cited

U.S. PATENT DOCUMENTS

| | | | |
|---|---|---|---|
| 5,945,932 A * | 8/1999 | Smith et al. ............ 341/51 |
| 6,850,525 B2 * | 2/2005 | Mitsumori et al. ..... 370/395.52 |
| 6,898,637 B2 * | 5/2005 | Curtin ..................... 709/231 |
| 6,940,849 B2 * | 9/2005 | Eichen et al. ............ 370/352 |
| 6,956,820 B2 * | 10/2005 | Zhu et al. .............. 370/230.1 |
| 7,197,436 B2 * | 3/2007 | Dinu et al. ............... 702/189 |
| 7,223,875 B2 * | 5/2007 | Kelly ...................... 549/529 |
| 2003/0007606 A1 * | 1/2003 | Suder et al. ............ 379/32.04 |
| 2003/0195960 A1 * | 10/2003 | Merriam .................. 709/224 |
| 2003/0227912 A1 * | 12/2003 | Kachi ..................... 370/352 |
| 2007/0053522 A1 * | 3/2007 | Murray et al. ........... 381/71.6 |
| 2007/0081561 A1 * | 4/2007 | Heninger et al. ........ 370/516 |
| 2007/0153774 A1 * | 7/2007 | Shay et al. .............. 370/352 |
| 2007/0189187 A1 * | 8/2007 | Ryu et al. ................ 370/252 |

* cited by examiner

*Primary Examiner*—Ricky Ngo
*Assistant Examiner*—Dewanda Samuel
(74) *Attorney, Agent, or Firm*—Matthew A. Pequignot; Pequignot + Myers LLC

(57) ABSTRACT

A direct way to measure network delay of a packet switched network uses a ping signal injected into the voice stream at a source telephone. The ping signal travels together with the voice stream to a destination telephone. The destination telephone detects the ping signal and returns it to the source telephone through the packet switched network. The source telephone detects the return ping signal sent by the destination telephone and calculates the network delay between the two telephones based on the difference between the time of transmitting the ping signal and the time of detecting the return ping signal. As the ping signal travels in the same path as the voice stream, the network delay between the two telephones is calculated directly and accurately.

27 Claims, 4 Drawing Sheets

DEVICE AND METHOD FOR DETERMINING A VOICE TRANSMISSION DELAY OVER A PACKET SWITCHED NETWORK

FIELD OF THE INVENTION

The present invention relates to a test device and more particularly a telecommunications test device for testing a network delay in a packet switched network.

BACKGROUND OF THE INVENTION

Over the years, more and more users as well as carriers have been switching from circuit switched communications networks to a more efficient and cheaper alternative of packet based communications networks to make telephone calls. For example, technology known as VoIP (Voice over Internet Protocol) is increasing being used to carry voice transmissions.

A key metric used to estimate Quality of Service (QoS) for voice transmissions over a packet network is an end-to-end delay. An important component of the delay is the amount of time it takes for voice data to traverse the network (referred to as "network delay").

One way to directly measure the network delay between two endpoints of a voice connection would be to synchronize their clocks to a degree of accuracy within a few milliseconds (ms). Voice traffic could then be time-stamped and transmitted. Since both ends of a connection would have common clocks, network delay is a simple calculation of subtracting the timestamp from arrival time. However, the capability to synchronize endpoint clocks to the needed accuracy across a wide area network does not exist in current commercial deployments.

Equipment utilizing the National Institute of Standards Technology (NIST) radio signals (WWV and others) typically have a rated accuracy of 50 ms. Depending on the method used to synchronize time across network devices, Network Time Protocol (NTP) being the most common, accuracy can vary up to 250 ms depending on topology. Global Positioning System (GPS) based clocks have the needed accuracy if they are designed for clock functionality rather than positioning. Additionally current GPS clocks are stationary with stringent open sky requirements and have the same limitations when synchronizing devices across a network as NIST based devices.

In existing commercial deployments of a packet switched (e.g., VoIP) telephone network, there is no direct method to measure the network delay. Instead, the most commonly implemented technique is to estimate the voice network delay by measuring the round trip time of an out-of-band management messages that are used in conjunction with a voice connection with the assumption being that the management messages take the same network path as voice messages. However, accurate estimation using this type of out-of-band messages requires that Real-time Transport Control Protocol (RTCP) be supported. RTCP is an optional protocol used in packet networks to exchange voice quality information.

This method has two major shortcomings. First, in many network configurations, RTCP is not or cannot be supported. Voice connections commonly include both packet and analog circuit switched (i.e., Public Switched Telephone Network) segments. RTCP is strictly a packet network protocol. It is not designed for transmission across analog networks, unlike easily converted voice traffic. Even in a strictly packet topology, RTCP is optional and may not be supported or enabled. The second problem is that there is no guarantee that RTCP messages take the same network path as voice data. Voice data is viewed as real-time, delay intolerant traffic. It is much more likely for a router to assign it a higher priority than a non real-time management message. As a result, estimating the network delay in voice traffic by measuring the roundtrip time of out-of-band management messages is inherently inaccurate.

Therefore, it is desirable to provide a device and method of more accurately estimating the delay of voice transmission over a packet switched communications network.

SUMMARY OF THE INVENTION

According to one aspect of the present invention, a method of determining a voice transmission delay over a packet switched network is provided. The method involves generating a ping signal at a source telephone device and inserting it into a voice stream signal to produce a mixed voice stream signal to be transmitted through the packet switched network to a destination device. Thus, the ping signal follows the same network path as the voice stream signal. The destination device returns the ping signal in a voice stream signal. The source telephone device detects the return ping signal contained in the voice stream signal that has been sent from the destination device. Upon detection, the voice transmission delay between the source telephone device and the destination device is determined based on the time of transmitting the ping signal at the source telephone device and the time of detecting the return ping signal.

As the ping signal travels in the same network path as the voice stream signal, the network delay between the source telephone device and the destination device is calculated directly and accurately.

According to another aspect of the present invention, a test device for determining a voice transmission delay over a packet switched network is provided. The test device includes a ping signal generator that generates a ping signal. A mixed mixes the generated ping signal and a voice stream signal to produce a mixed voice stream signal for transmission through the packet switched network to a destination device. A signal detector receives a mixed voice stream signal from the destination device and detects a return ping signal contained in the received mixed voice stream signal. Upon detection, a processor determines the voice transmission delay between the test device and the destination device based on the time of transmitting the ping signal and the time of detecting the return ping signal.

DETAILED DESCRIPTION OF THE INVENTION

According to one principle of the present invention, a test ping signal is injected or mixed into the voice stream in a source telephone. The ping signal travels together with the voice stream to a destination telephone device. The destination telephone detects the ping signal and returns it to the source telephone through the voice stream either by looping the ping signal back or transmitting a new ping signal. Because the ping signal travels in the same path as the voice stream, the present invention allows the source telephone to directly and accurately calculate the network delay of voice data transmission through a communications network in which at least a portion of the network is a packet switched network.

Figure 1:
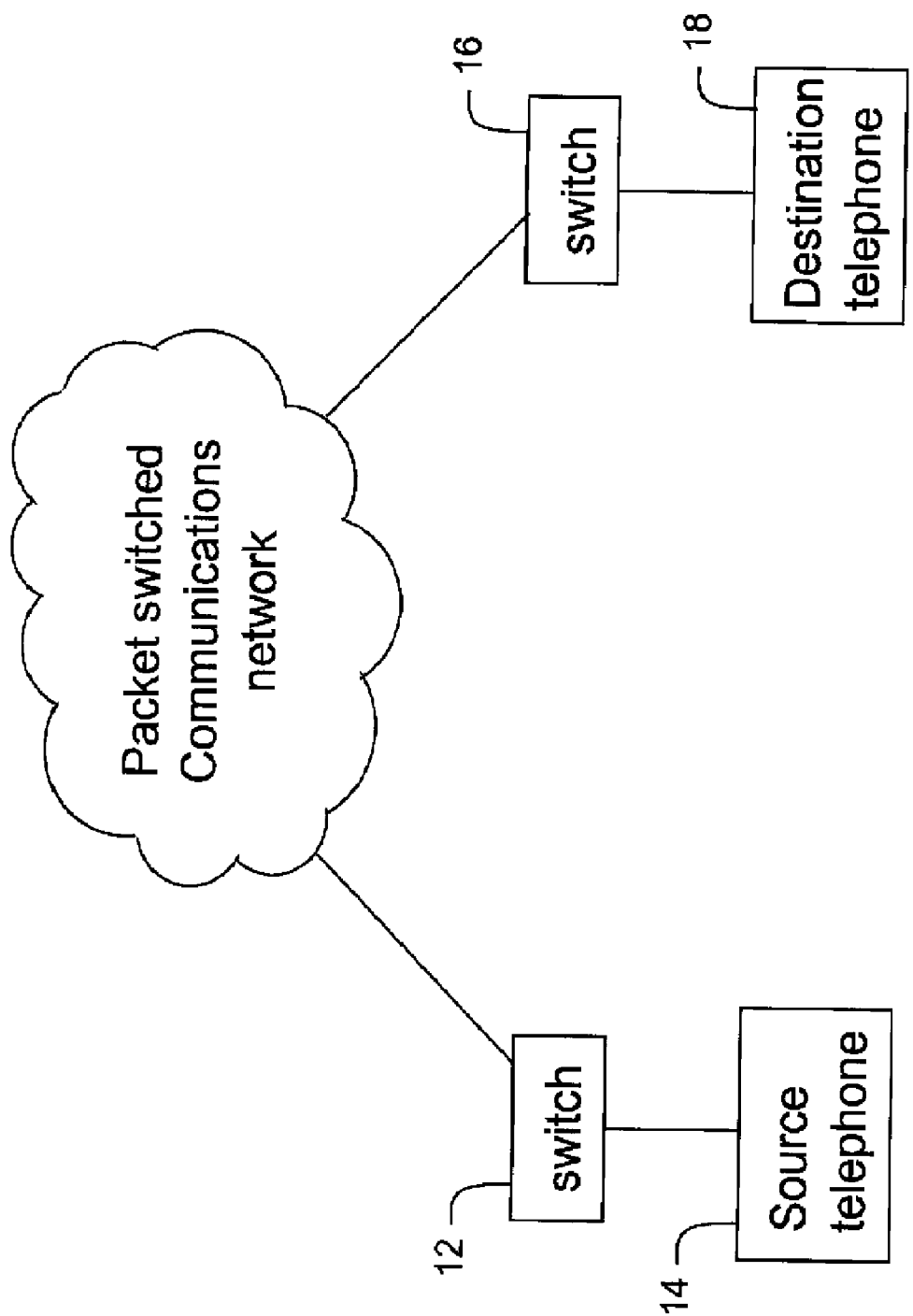
FIG. 1 is an illustration of a communications network that includes a packet switched network to carry data.

FIG. 1 shows a general communications network 10 capable of carrying voice traffic. The network 10 may be a pure packet switched network or a combination of circuit switched networks and packet switched networks. A switch 12 such as a router or PBX or the like is connected to both a source telephone 14 and the network 10. Similarly, a switch 16 is connected to both a destination telephone 18 and the network 10. A user at the source telephone 14 therefore communicates with someone at the destination telephone 18 through the network 10. As the network 10 includes a packet switched network, the communication path from the source switch 12 through the destination switch 16 can switch dynamically during any particular telephone call as determined by the network 10.

Figure 3A:
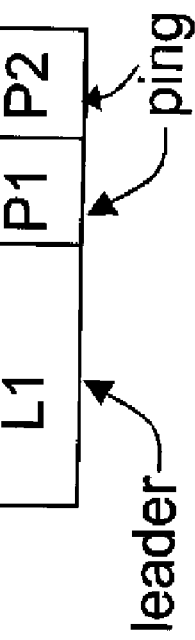
FIGS. 3A and 3B illustrate ping signals used to measure the network delay of voice data transmission according to the present invention.

To test the network delay of a voice call, a test ping signal is injected into the voice stream at the source telephone 14, one example of which is shown in FIG. 3A. The ping signal includes a leader (pilot) tone L1 immediately followed by a ping tone P1, each lasting for 50% of the time. In the embodiment shown, the duration of each tone is 20 ms. The leader tone L1 is a preamble designed for two purposes. First, voice activity detectors (VADs) in telephones may clip a part of the voice stream when transitioning from silence suppression to active speech. By having a leader tone L1, the entire ping tone is preserved through the VADs. Second, the leader tone L1 allows a more stable encoding of the ping tone P1 when using complex voice encoding techniques (a class of coder/decoders called vocoders).

In the embodiment shown, the leader tone L1 is a relatively low 100 Hz (in other embodiments, the tone may be below 150 hz, for example). The ping tone P1 is any one or more of 200, 400, 700, 1500, 2000 and 2500 Hz which are within the supported frequency range for voice. These tone frequencies also roughly correspond to the frequency divisions used by perceptual analysis techniques.

The tone frequencies are fine tuned to match the local language based on known anomalies with some world languages. They would be tones that are commonly not removed by filters, cross encoding from one codec to another, and by VAD's. This ensures that for most phone calls, the tones will not be removed by hardware or software in the path of the voice call.

The relatively low frequencies were also chosen because the human ear is more adept at differentiating tones at lower frequencies than high frequencies and also because most codecs more accurately represent lower tones.

In another embodiment, instead of a single ping signal, a series of ping signals are successively sent to allow recovery from lost ping signals. For example, four ping signals comprised of 100/200 Hz signal, 100/400 Hz signal, 100/700 Hz and 100/200 Hz signal could be successively sent from the source telephone 14.

Ping signals originating from the destination telephone 18 should be different from those originating from the source telephone 14 so that each telephone device can distinguish ping requests from ping responses. As an example, a leader tone L1 can be followed by a higher tone P1 (1500, 2000 or 2500 Hz.).

Figure 3B:
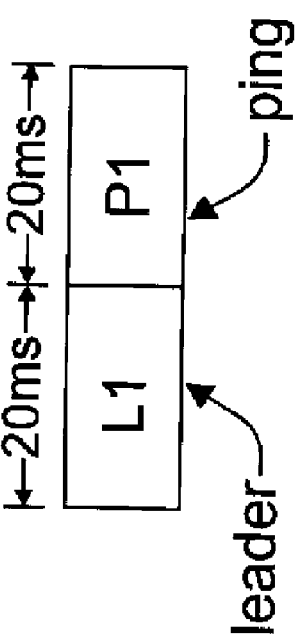

Instead of having one ping tone in a ping signal, two or more ping tones can be used as shown in FIG. 3B. The ping signal in FIG. 3B comprises a leader tone L1, a first ping tone P1 and a second ping tone P2 having a duration respectively of 20 ms, 5 ms and 5 ms. In the embodiment shown, the first ping tone P1 is a lower frequency tone being any one of 200, 400 and 700 Hz while the second ping tone P2 is a higher frequency tone being any one of 1500, 2000 and 2500 Hz.

Instead of a single ping signal with multiple ping tones, a series of ping signals each with multiple ping tones can be successively sent to allow for even more robust recovery from lost ping signals. For example, four ping signals comprised of 100/200/1500 Hz signal, 100/400/2000 Hz signal, 100/700/2500 Hz and 100/200/1500 Hz signal could be sent from the source telephone 14.

Ping signals originating from the destination telephone 18 should be different from those originating from the source telephone 14 so that each telephone device can distinguish ping requests from ping responses. As an example, a leader tone L1 can be followed by a higher tone P1 (1500, 2000 or 2500 Hz.) and a lower tone P2 (200, 400 or 700 Hz) such that four ping signals comprised of 100/1500/200 Hz signal, 100/2000/400 Hz signal, 100/2500/700 Hz and 100/1500/200 Hz signal could be sent from the destination telephone 18.

Figure 2:
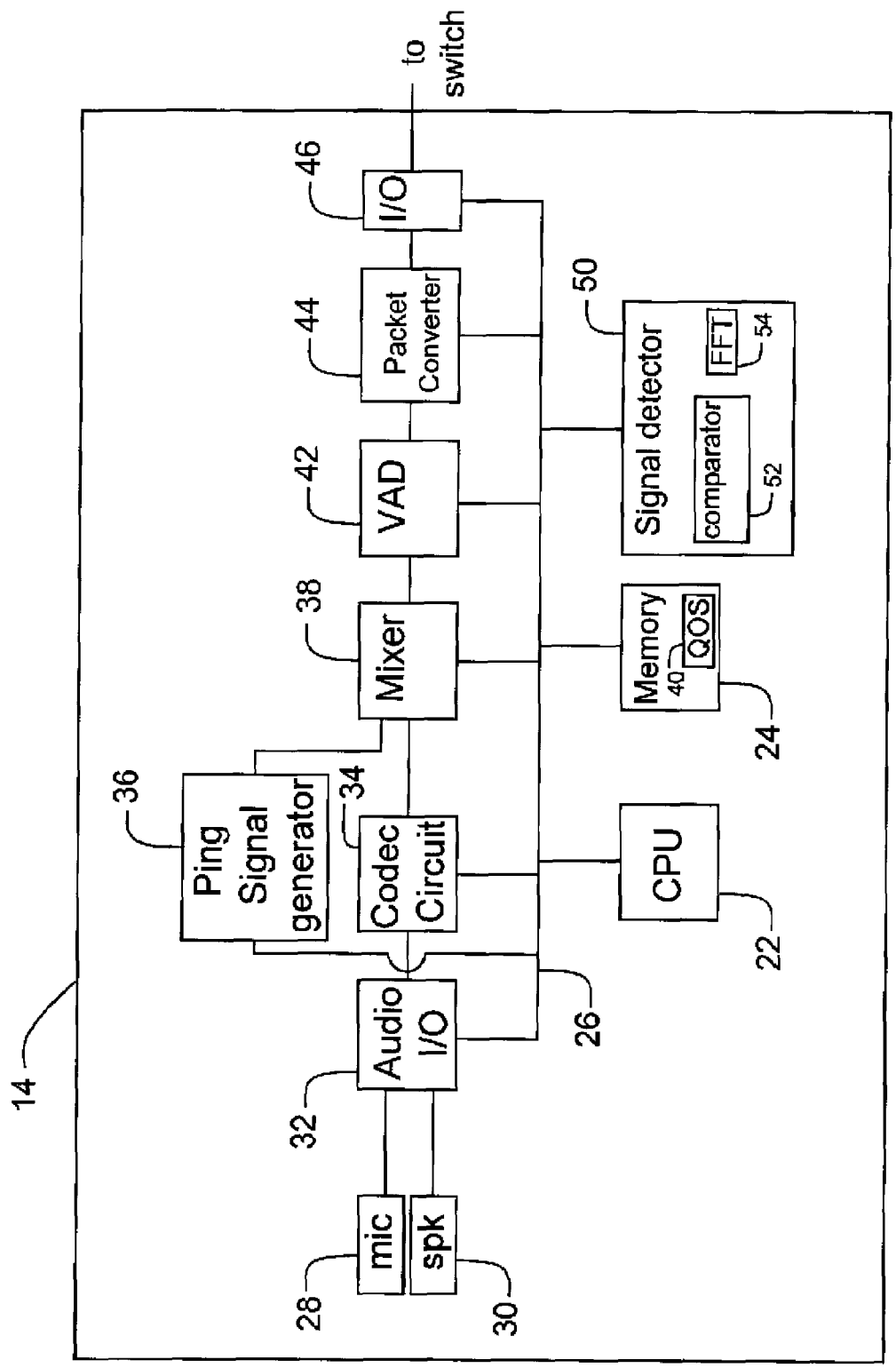
FIG. 2 is a functional block diagram of a telephone device that directly measures the network delay of voice data transmission according to the present invention.

FIG. 2 is a functional block diagram of the source telephone 14 that directly measures the network delay of voice data transmission using the ping signal described above. A processor 22 and memory 24 are connected to a common bus 26. The memory stores a quality-of-service (QOS) software program 40 that controls the injection and detection of the ping signal and measures the network delay of voice data transmission through the communications network 10.

A microphone 28 and speaker 30 are connected to an audio I/O chip 32 that amplifies the signal to and from a codec circuit 34 which is connected to the bus 26. The codec circuit 34 converts an analog signal from the microphone 28 into a digital signal for transmission to the destination telephone 18 and converts a digital signal representing a voice stream from the destination telephone 18 into an analog signal for reproduction through the speaker 30. Under control of the QOS program 40, the ping signal of FIG. 3 is generated by a ping signal generator 36. In the embodiment shown, the ping signal is a digital signal. Alternatively, the ping signal can be an analog signal that is inputted to the codec circuit 34 for conversion to a digital signal. A mixer 38 connected to the bus 26 and under control of the QOS program 40 mixes the generated ping signal and the digital voice stream signal output of the codec circuit 34. In one method, the ping signal is superimposed on the digital voice stream signal by multiplying or adding the two signals together. Alternatively, the mixer 38 replaces a portion of the digital voice stream signal with the ping signal. In either case, the ping signal is inserted into the voice stream signal.

A VAD (voice activity detection) circuit 42 connected to the bus 26 receives and monitors voice activity on the output of the mixer 38. The VAD circuit 42 only generates digital voice stream data when there is voice activity or ping signal which is considered to be voice activity. A packet converter 44 connected to the bus 26 converts the digital voice stream from the VAD circuit 42 and formats it into a suitable series of packets according to the packet switch protocol being used. An I/O interface circuit 46 receives the data packets containing voice stream data and transmits them to the switch 12 to be routed through the packet switched network 10, the switch 16 and eventually to the destination telephone 18.

In the embodiment shown, the internal circuits of the destination telephone 18 are the same as those in the source telephone 20 shown in FIG. 2. The I/O circuit interface 46 receives the digital voice stream from the switch 16. The received voice stream is then monitored by a signal detector 50 connected to the bus 26 and under control of the QOS program 40 running inside the destination telephone 18. The signal detector 50 includes a comparator 52 and a transform circuit 54 such as an FFT (fast Fourier transform) circuit that converts a digital voice stream in the time domain to a signal level in the frequency domain, i.e., as a function of frequency. The transform circuit 54 can be implemented as a dedicated hardware, combination of software and hardware such as DSP or pure software executed by the processor 22.

Figures 4A, 4B:
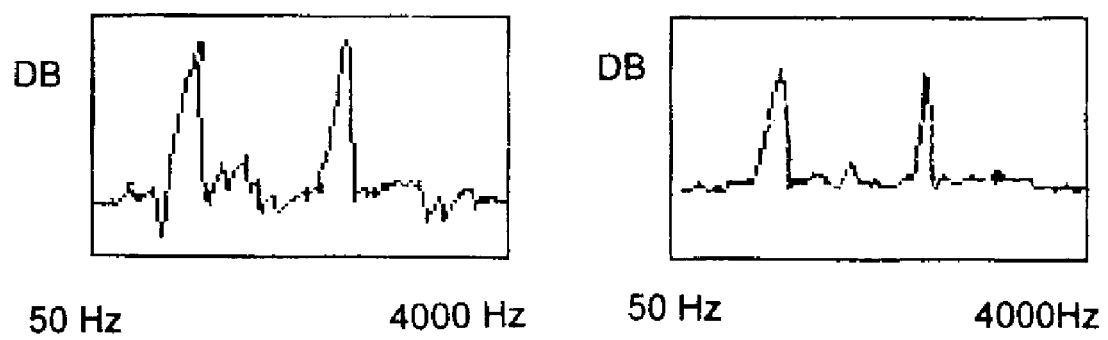
FIGS. 4A and 4B are graphical illustrations of the amplitude of a voice stream containing a ping signal as a function of frequency.

FIG. 4A illustrates the amplitude of a raw voice stream containing a ping signal at a fixed point of time as a function of frequency which was generated by the transform circuit 54. As can be seen, the two peaks represent the leader tone L1 and ping tone P1 that were sent through the voice stream by the source telephone 14. The output is then filtered by the transform circuit 54 to remove static, echo, comfort sound, continuous energy below 3 dB and the like. The final output of the transform circuit 54 is shown in FIG. 4B which shows a more clearly defined peaks. The comparator then compares the output to a predefined threshold level such as 30 dB at particular leader and ping tone frequencies. If the signal levels at those frequencies are above the predefined threshold level, then there is a positive detection of the ping signal.

For more accuracy, the frequency transform of the voice stream signal by the transform circuit 54 is performed at a sufficiently frequent rate to allow comparison of at least several outputs within a given ping tone signal period. For example, the frequency transform output can be generated every one ms. In that case, the comparator 52 outputs a positive detection of the ping signal only if there are at least several successive detection of signal levels above the threshold level at the particular leader and ping tone frequencies.

Once the ping signal has been detected by the signal detector 50, the destination telephone 18 returns the ping signal to the source telephone 14. There are several ways to achieve this. One way is to have the ping signal generator 36 regenerate a clean ping signal and send it out as part of the voice stream. This method has the advantage of cleaning up any distortions the ping signal may have picked up along the way. Another way is for the destination telephone 18 to loop back the incoming voice stream upon detection of the ping signal. The I/O interface circuit 46 can be equipped to loop back the signal or a dedicated loop back circuit (not shown) can be added such as between the packet converter 44 and the I/O interface circuit 46. Another way is to insert a message via a signaling protocol instructing the destination telephone 18 to loop back all of the voice stream packets or all packets including data packets.

If the destination telephone 18 is not an intelligent device such as device 20, then a technician or user at the destination telephone can manually loop back the data traffic or an intelligent device nearest to the destination telephone such as the switch 16 can be instructed via an out-of-band signaling message to loop back the traffic.

Once the ping signal is returned by the destination device or switch 16, the source telephone 14 receives it through the I/O interface circuit 46. The signal detector 50 then detects the ping signal as described above. Upon detection, the QOS program 40 calculates the round trip time of the ping signal to measure the network delay. By inserting the ping signal in the voice stream, the present invention provides a true and direct round trip delay for voice traffic. The present invention works across mixed packet and circuit switched networks, does not depend on any optional management protocols being supported and does not require clock synchronization or additional hardware.

The foregoing specific embodiments represent just some of the ways of practicing the present invention. Many other embodiments are possible within the spirit of the invention. Accordingly, the scope of the invention is not limited to the foregoing specification, but instead is given by the appended claims along with their full range of equivalents.

What is claimed is:

1. A method of determining a voice transmission delay over a packet switched network, comprising:
   generating a ping signal including generating a leader tone at a frequency below 150 Hz, a first ping tone at a first frequency, and a second ping tone at a second frequency different from the first frequency, the first and second frequencies being higher than the leader tone frequency;
   inserting at a source telephone device the generated ping signal into a voice stream signal to produce a mixed voice stream signal to be transmitted through the packet switched network to a destination device;
   detecting a return ping signal contained in a mixed voice stream signal that has been sent from the destination device; and
   determining the voice transmission delay between the source telephone device and the destination device based on the time of transmitting the ping signal at the source telephone device and the time of detecting the return ping signal.

2. The method according to claim 1, further comprising looping back the mixed voice stream signal by the destination device upon receiving a loop back control instruction via an out-of-band signaling message.

3. The method according to claim 1, further comprising looping back the mixed voice stream signal by the destination device if the destination device determines that the mixed voice stream signal contains the generated ping signal.

4. The method according to claim 1, further comprising:
   if the destination device determines that the mixed voice stream signal contains the generated ping signal, performing the following steps by the destination device:
   generating a return ping signal; and
   transmitting the generated return ping signal through the packet switched network to the source telephone device.

5. A method of determining a voice transmission delay over a packet switched network, comprising:
   generating a ping signal including generating a leader tone at a leader tone frequency, a first ping tone at a first frequency, and a second ping tone at a frequency different from the first frequency, the first and second frequencies being higher than the leader tone frequency;
   inserting at a source telephone device the generated ping signal into a voice stream signal to produce a mixed voice stream signal to be transmitted through the packet switched network to a destination device;
   detecting a return ping signal contained in a mixed voice stream signal that has been sent from the destination device; and
   determining the voice transmission delay between the source telephone device and the destination device based on the time of transmitting the ping signal at the source telephone device and the time of detecting the return ping signal;

wherein the step of detecting a return ping signal comprises:
  performing a frequency transform on the mixed voice stream signal that has been sent from the destination device to produce a frequency spectrum signal; and
  detecting the ping signal based on analysis of the frequency spectrum signal.

6. The method according to claim 5, wherein the step of detecting the ping signal based on analysis of the frequency spectrum signal includes determining whether the signal level of the frequency spectrum signal at a selected frequency is beyond a selected threshold value.

7. The method according to claim 6, further comprising repeating the step of determining whether the signal level of the frequency spectrum signal at a selected frequency is beyond a selected threshold value to determine the duration of the signal level of the frequency spectrum signal at the selected frequency being above the selected threshold value.

8. The method according to claim 5, wherein the step of generating a ping signal includes generating a leader tone at a frequency below 150 Hz and a ping tone at a frequency above 150 Hz.

9. The method according to claim 5 wherein the step of generating a ping signal includes generating a leader tone at a leader frequency below 150 Hz, a first ping tone at a first frequency and a second ping tone at a second frequency different from the first frequency, the first and second frequencies being higher than the leader tone frequency.

10. A method of determining a voice transmission delay over a packet switched network, comprising:
  generating a ping signal containing a leader tone at a frequency below 150 Hz, a first ping tone at a first frequency, and a second ping tone at a second frequency different from the first frequency, the first and second frequencies being higher than the leader tone frequency;
  inserting at a source telephone device the generated ping signal into a voice stream signal to produce a mixed voice stream signal to be transmitted through the packet switched network to a destination device;
  receiving a mixed voice stream signal that has been sent from the destination device through the packet switched network;
  detecting a return ping signal contained in the received mixed voice stream signal; and
  determining the voice transmission delay between the source telephone device and the destination device based on the difference between the time of transmitting the ping signal at the source telephone device and the time of detecting the return ping signal.

11. The method according to claim 10, further comprising looping back the mixed voice stream signal by the destination device upon receiving a loop back control instruction via an out-of-band signaling message.

12. The method according to claim 10, further comprising looping back the mixed voice stream signal by the destination device if the destination device determines that the mixed voice stream signal contains the generated ping signal.

13. The method according to claim 10, further comprising:
  if the destination device determines that the mixed voice stream signal contains the generated ping signal, performing the following steps by the destination device:
    generating a return ping signal; and
    transmitting the generated return ping signal through the packet switched network to the source telephone device.

14. A method of determining a voice transmission delay over a packet switched network, comprising:
  generating a ping signal including generating a leader tone at a frequency below 150 Hz, a first ping tone at a first frequency, and a second ping tone at a second frequency different from the first frequency, the first and second frequencies being higher than the leader tone frequency containing a leader tone and a ping tone;
  inserting at a source telephone device the generated ping signal into a voice stream signal to produce a mixed voice stream signal to be transmitted through the packet switched network to a destination device;
  receiving a mixed voice stream signal that has been sent from the destination device through the packet switched network;
  detecting a return ping signal contained in the received mixed voice stream signal; and
  determining the voice transmission delay between the source telephone device and the destination device based on the difference between the time of transmitting the ping signal at the source telephone device and the time of detecting the return ping signal;
  wherein the step of detecting a return ping signal comprises:
    performing a frequency transform on the mixed voice stream signal that has been sent from the destination device to produce a frequency spectrum signal; and
    detecting the ping signal based on analysis of the frequency spectrum signal.

15. The method according to claim 14, wherein the step of detecting the ping signal based on analysis of the frequency spectrum signal includes determining whether the signal level of the frequency spectrum signal at a selected frequency is above a selected threshold value.

16. The method according to claim 15, further comprising repeating the step of determining whether the signal level of the frequency spectrum signal at a selected frequency is above a selected threshold value to determine the duration of the signal level of the frequency spectrum signal at the selected frequency being above the selected threshold value.

17. The method according to claim 14, wherein the step of generating a ping signal includes generating a leader tone at a frequency below 150 Hz and a ping tone at a frequency above 150 Hz.

18. The method according to claim 14, wherein the step of generating a ping signal includes generating a leader tone at a leader frequency below 150 Hz, a first ping tone at a first frequency and a second ping tone at a second frequency different from the first frequency, the first and second frequencies being higher than the leader tone frequency.

19. A test device for determining a voice transmission delay over a packet switched network, comprising:
  a ping signal generator operable to generate a ping signal including a leader tone at a frequency below 150 Hz, a first ping tone at a first frequency, and a second ping tone at a second frequency different from the first frequency, the first and second frequencies being higher than the leader tone frequency;
  a mixer operable to mix the generated ping signal and a voice stream signal to produce a mixed voice stream signal for transmission through the packet switched network to a destination device;
  a signal detector operable to receive a mixed voice stream signal from the destination device and detect a return ping signal contained in the received mixed voice stream signal; and
  a processor coupled to the signal detector and operable to determine the voice transmission delay between the test device and the destination device upon detection of the return ping signal by the signal detector based on the time of transmitting the ping signal and the time of detecting the return ping signal.

20. The test device according to claim 19, further comprising a destination device adapted to loop back the mixed voice stream signal upon receiving a loop back control instruction via an out-of-band signaling message.

21. The test device according to claim 19, further comprising a destination device adapted to loop back the mixed voice stream signal if the destination device determines that the mixed voice stream signal contains the generated ping signal.

22. The test device according to claim 19, further comprising a destination device including:
   a destination ping signal generator operable to generate a return ping signal; and
   an I/O interface circuit operable to transmit the generated return ping signal through the packet switched network.

23. A test device for determining a voice transmission delay over a packet switched network, comprising:
   a ping signal including generating a leader tone at a frequency below 150 Hz, a first ping tone at a first frequency, and a second ping tone at a second frequency different from the first frequency, the first and second frequencies being higher than the leader tone frequency generator operable to generate a ping signal;
   a mixer operable to mix the generated ping signal and a voice stream signal to produce a mixed voice stream signal for transmission through the packet switched network to a destination device;
   a signal detector operable to receive a mixed voice stream signal from the destination device and detect a return ping signal contained in the received mixed voice stream signal; and
   a processor coupled to the signal detector and operable to determine the voice transmission delay between the test device and the destination device upon detection of the return ping signal by the signal detector based on the time of transmitting the ping signal and the time of detecting the return ping signal;
   wherein the signal detector comprises: a frequency transform device operable to perform a frequency transform on the mixed voice stream signal that has been sent from the destination device to produce a frequency spectrum signal; and a comparator that compares the frequency spectrum signal against a selected threshold level.

24. The test device according to claim 23, wherein the comparator determines whether the signal level of the frequency spectrum signal at a selected frequency is beyond the selected threshold value.

25. The test device according to claim 24, wherein the comparator repeatedly determines whether the signal level of the frequency spectrum signal at the selected frequency is beyond the selected threshold value to determine the duration of the signal level of the frequency spectrum signal at the selected frequency being above the selected threshold value.

26. The test device according to claim 23, wherein the ping signal generator generates as the ping signal a leader tone at a frequency below 150 Hz and a ping tone at a frequency above 150 Hz.

27. The test device according to claim 23, wherein the ping signal generator generates as the ping signal a leader tone at a leader frequency below 150 Hz, a first ping tone at a first frequency and a second ping tone at a second frequency different from the first frequency, the first and second frequencies being higher than the leader tone frequency.

* * * * *